United States Patent [19]

Ogawa et al.

[11] Patent Number: 4,748,397

[45] Date of Patent: May 31, 1988

[54] CONTROL DEVICE FOR CHOPPERS PARALLEL BETWEEN A DC POWER SOURCE AND A LOAD FOR PRODUCING BALANCED CHOPPER CURRENTS

[75] Inventors: Kiyoshi Ogawa, Fuchu; Yoshizo Akao, Hino, both of Japan

[73] Assignee: Kabushiki Kaisha Toshiba, Kawasaki, Japan

[21] Appl. No.: 51,186

[22] Filed: May 18, 1987

Related U.S. Application Data

[63] Continuation of Ser. No. 809,309, Dec. 16, 1985, abandoned.

[30] Foreign Application Priority Data

Dec. 17, 1984 [JP] Japan ............................. 59-264411
Sep. 6, 1985 [JP] Japan ............................. 60-195743

[51] Int. Cl.$^4$ ................................ H02M 3/142
[52] U.S. Cl. ............................. 323/222; 323/272
[58] Field of Search ............... 323/222, 272; 363/26, 363/71

[56] References Cited

U.S. PATENT DOCUMENTS

| | | | |
|---|---|---|---|
| 3,913,000 | 10/1975 | Cardwell | 363/20 |
| 3,956,638 | 5/1976 | Ahrens et al. | 307/48 |
| 3,978,393 | 8/1976 | Wisner et al. | 363/19 |
| 4,005,352 | 1/1977 | Kugler et al. | 363/26 |
| 4,074,182 | 2/1978 | Weischedel | 323/272 |
| 4,150,425 | 4/1979 | Frosch | 363/71 |
| 4,257,090 | 3/1981 | Kroger et al. | 323/222 |
| 4,425,613 | 1/1984 | Shelly | 363/71 |

FOREIGN PATENT DOCUMENTS

| | | | |
|---|---|---|---|
| 2356452 | 5/1975 | Fed. Rep. of Germany . | |
| 2916833 | 11/1980 | Fed. Rep. of Germany | 363/26 |
| 959054 | 9/1982 | U.S.S.R. | 323/222 |

OTHER PUBLICATIONS

Miyairi, Shota, "Thyristor Application Handbook", pp. 192-196, 1972.
Bedford et al, "Principles of Inverter Circuits", Sections 10.2 and 10.3, pp. 319-332, 1964.

*Primary Examiner*—William H. Beha, Jr.
*Attorney, Agent, or Firm*—Schwartz, Jeffery, Schwaab, Mack, Blumenthal & Evans

[57] ABSTRACT

A control device for a chopper apparatus derives chopper currents from preset positions of the chopper circuit, detects the deviations of the chopper currents from an average chopper current, and inputs the deviations to a chopper output voltage control system to balance the chopper currents.

3 Claims, 7 Drawing Sheets

CONTROL DEVICE FOR CHOPPERS PARALLEL BETWEEN A DC POWER SOURCE AND A LOAD FOR PRODUCING BALANCED CHOPPER CURRENTS

This application is a continuation of application Ser. No. 809,309, filed Dec. 16, 1985 now abandoned.

BACKGROUND OF THE INVENTION

1. Field of the Invention

The present invention relates to a chopper apparatus and more particularly, to a control device for a chopper apparatus for balancing currents flowing through a plurality of choppers connected in parallel.

2. Description of the Prior Art

Choppers are used as converters for converting a DC voltage into another DC voltage having a desired voltage value and are widely used in various applications such as a constant voltage device.

The basic arrangement of a chopper is of a single phase type. This type however is associated with a problem that a large amount of ripple is included in a supply current fed from a DC source to the chopper. Therefore, a two phase type chopper is commonly used.

The chopper of a two phase type however is associated with a problem that it is difficult to balance currents of the choppers driven at different phases. Therefore, various countermeasures have been required heretofore.

SUMMARY OF THE INVENTION

It is an object of the present invention to provide the chopper apparatus capable of readily balancing currents flowing through a plurality of choppers with a low cost and simple circuit arrangement.

According to a first aspect of the present invention and in order to achieve the above object, the control device for the chopper apparatus is constructed in such a way that chopper currents flowing through the choppers are derived from preset positions of the chopper circuit, the deviations of the chopper currents from an average chopper current are detected, and the deviations are inputted to a chopper output voltage control system to balance the chopper currents.

According to a second aspect of the present invention and in order to achieve the above object, the control device for the chopper apparatus is constructed in such a way that chopper currents are derived either from the input side or the output side of a plurality of choppers connected in parallel, the deviations between the chopper currents are detected, and the deviations are inputted to a chopper output voltage control system to balance the chopper currents of the plurality of the choppers.

DETAILED DESCRIPTION OF THE INVENTION

The prior art will first be described with reference to FIGS. 6 to 9, and thereafter the preferred embodiments of the present invention will be described with reference to FIGS. 1 to 5.

Figure 6:
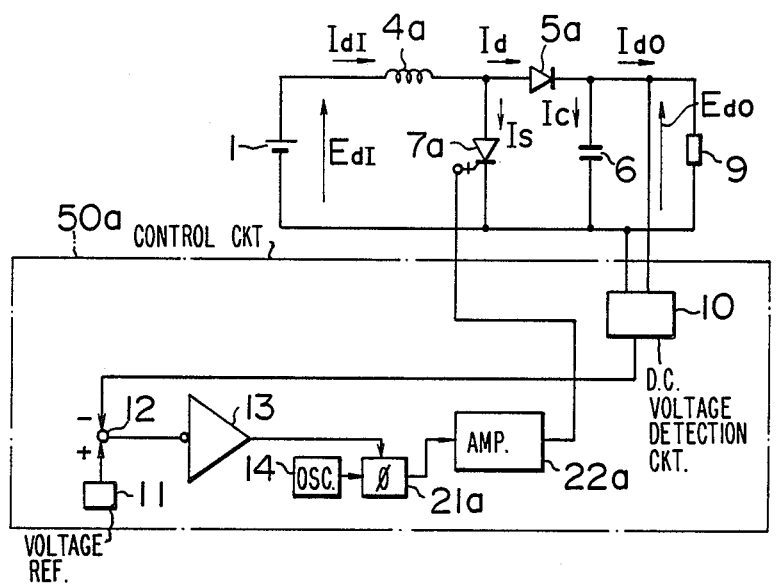
FIG. 6 is a circuit diagram showing an example of a step-up and single phase chopper according to the prior art.
Figure 7:
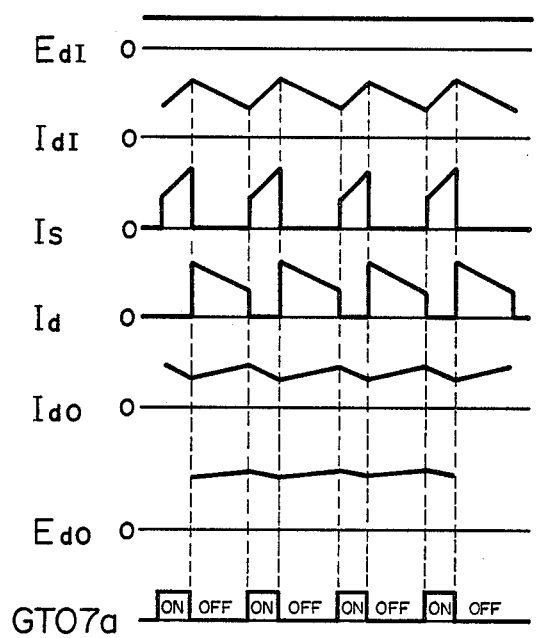
FIG. 7 is a timing chart for explaining the operation of the circuit of FIG. 6.

FIG. 6 is a circuit diagram showing an example of the prior art step-up and single phase chopper, and FIG. 7 is a timing chart for explaining the operation of the circuit of FIG. 6. Prior to the description of the present invention, the basic operation of a step-up chopper will be described. In FIG. 6, reference numeral 1 denotes a DC power source, reference 4a stands for a DC reactor, 5a for a diode, 6 for a capacitor and 7a for a gate turn-off thyristor (hereinafter referred to as GTO). A DC voltage detection circuit 10 detects the output voltage of the step-up chopper, converts it into a proper isolation/control circuit voltage level, and outputs a voltage of a negative value. Reference numeral 11 represents a reference voltage. A comparator 12 compares the output voltage of the DC voltage detection circuit 10 with the reference voltage 11. An error amplifier 13 amplifies a difference voltage obtained through comparison by the comparator 12. A phase shifter 21a shifts the phase of the pulse signal from an oscillator 14 in accordance with the output level of the error amplifier 13. A pulse amplifier circuit 22a isolates the output pulse of the phase shifter 21a, amplifies and supplies it to GTO 7a. A control circuit 50a is constructed of the DC voltage detection circuit 10, comparator 12, error amplifier 13, phase shifter 21a and pulse amplifier circuit 22a. In FIG. 7, $E_{dI}$ and $E_{dO}$ correspond to the voltages shown in FIG. 6 and $I_{dI}$, $I_s$, $I_d$ and $I_{dO}$ correspond to the currents shown in FIG. 6.

During a steady state, as shown in FIG. 7, the current $I_{dI}$ flowing through the DC reactor 4a does not flow through the diode 5a but it only flows through GTO 7a while GTO 7a is at an ON period, as shown in FIG. 7. Therefore, the load current $I_{dO}$ is supplied only from the capacitor 6 and is not supplied from the DC reactor 4. Alternatively, while GTO 7a is at an OFF period, $I_s=0$ and $I_{dI}=I_d$ so that the current $I_d$ flows as the current $I_c$ charging the capacitor 6 and the load current $I_{dO}$.

In the step-up chopper of FIG. 6, it is here assumed that the ON period of GTO 7a is $T_{ON}$ and the OFF period thereof is $T_{OFF}$. Then the following equation is established between the chopper input voltage $E_{dI}$ and the chopper output voltage $E_{dO}$:

$$E_{dO} = \frac{T_{ON} + T_{OFF}}{T_{OFF}} \cdot E_{dI} \qquad (1)$$

As apparent from the equation (1), the shorter the OFF period, i.e., the longer the ON period, the higher the chopper output voltage becomes. Conversely, the longer the OFF period $T_{OFF}$, i.e., the shorter the ON period, the lower the chopper output voltage becomes.

Next, the operation of the control circuit 50a will be described. In FIG. 6, the control circuit 50a operates to always maintain the chopper output voltage $E_{dO}$ constant even if the chopper input voltage $E_{dI}$ varies. In particular, assuming that the chopper input voltage $E_{dI}$ becomes high, the chopper output voltage $E_{dO}$ also becomes high in accordance with a change of the chopper input voltage until the control circuit 50a starts operating. Therefore, the output voltage (negative value) of the DC voltage detection circuit 10 becomes large. Since the reference voltage (positive value) is constant, the output of the error amplifier 13 becomes small. As a result, the phase shifter 21a operates to make the ON period $T_{ON}$ of GTO 7a shorter, thereby lowering the chopper output voltage. In the above-noted automatic control system, with the constant value of the reference voltage 11, the output voltage is always controlled to maintain constant against a change of the chopper input voltage. Such a method of controlling the output voltage has already been known, so the description therefor will not be given except the foregoing.

The prior art step-up chopper described above, however, has the following disadvantages. For instance, as apparent from FIG. 7, since the ripple component of the chopper input current $I_{dI}$ is great, the DC power source (or an AC power source in case a DC power source obtained by rectification of the AC power source is used) is adversely affected.

Figure 8:
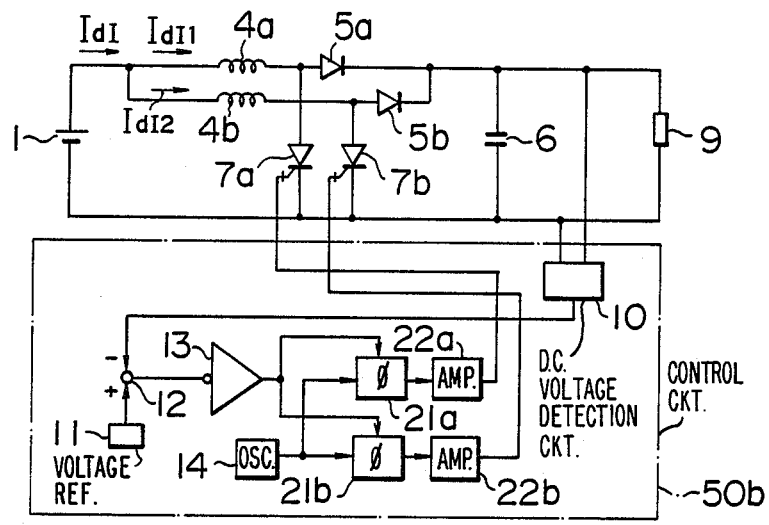
FIG. 8 is a circuit diagram showing an example of step-up and two phase choppers according to the prior art.
Figure 9:
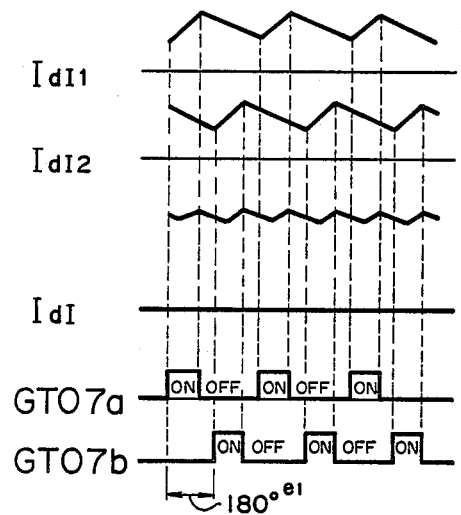
FIG. 9 is a timing chart for explaining the operation of the circuit of FIG. 8.

Therefore, to reduce the ripple component of the chopper input current $I_{dI}$, a method has been introduced which uses a plurality of step-up choppers as of FIG. 6 operating in parallel at shifted phases therebetween. An example of such a method is shown in FIGS. 8 and 9. FIG. 8 is a circuit diagram showing an example of the prior art two phase and step-up choppers, and FIG. 9 is a timing chart for explaining the operation of the circuit of FIG. 8. In FIG. 8, the elements designated by the same reference numerals as in FIG. 6 have identical functions to those in FIG. 6, and the description therefor is omitted. The difference between the circuits of FIGS. 8 and 6 reside in that only a single set of DC reactor, diode and GTO constitutes a step-up chopper apparatus in FIG. 6, while in FIG. 8 two sets are used for constituting a chopper apparatus, and that since each GTO of the step-up chopper apparatus is provided with a phase shifter and a pulse amplifier circuit, GTO 7a and GTO 7b can be separately controlled as shown in FIG. 9. The phase shifters 21a and 21b are controlled by unrepresented clock pulses different in phase by 180 degrees (electrical angle). Therefore, current waveforms are obtained as shown in FIG. 9 so that the ripple of the chopper input current can be reduced smaller than half that in FIG. 7. As seen from the foregoing description, each chopper of n (n: integral number) choppers is driven with a phase difference of 360°/n (electrical angle). Therefore, the ripple of the chopper input current is reduced by 1/n as compared with that of FIG. 7.

In case a plurality of step-up choppers are driven in parallel with respective phases shifted as described above, there is a problem that it is difficult to balance currents of the choppers. That is, as apparent from the equation (1), if there is a difference in switching times of the switching elements of the choppers, i.e., a difference in the OFF periods, the output voltages $E_{dO}$ of the choppers differ from each other on condition that the choppers are not connected in parallel. More in particular, the choppers are actually connected in parallel and the output terminals of the choppers are connected in common, so that the potentials at the terminals are also the same. Consequently, it is necessary for the chopper whose OFF period is short, or the output voltage is high, to have a larger amount of current than that of the chopper whose OFF period is long, or the output voltage is low, so that a difference in voltage drops of the DC reactors and diodes between the choppers may occur. In other words, the chopper whose OFF period $T_{OFF}$ is short is made to have a greater internal voltage drop to lower the output voltage. Thus, the output voltage is rendered to coincide with that of the chopper whose OFF period $T_{OFF}$ is long.

As seen from the foregoing description, according to the prior art, it is necessary to select the switching elements of the choppers so as to make the switching times as equal as possible, or to have a large resistance value of the DC reactor. Selecting the switching elements of the choppers so as make the switching times as equal as possible is not so easy in actual manufacture of the chopper apparatus and also makes the apparatus expensive. Having a large resistance value of the DC reactor results in a remarkable degradation of efficiency and a bulky dimension of the apparatus, which is not beneficial in practical use. Even though the countermeasures as described above are employed, the fact is that it has been difficult heretofore to balance currents of the choppers.

DESCRIPTION OF THE PREFERRED EMBODIMENTS

An embodiment of the present invention will be described by referring to FIG. 1. The element labels and their operational functions in FIG. 1 designated by the same references as of FIG. 8 are the same as of the corresponding elements of FIG. 8.

Figure 1:
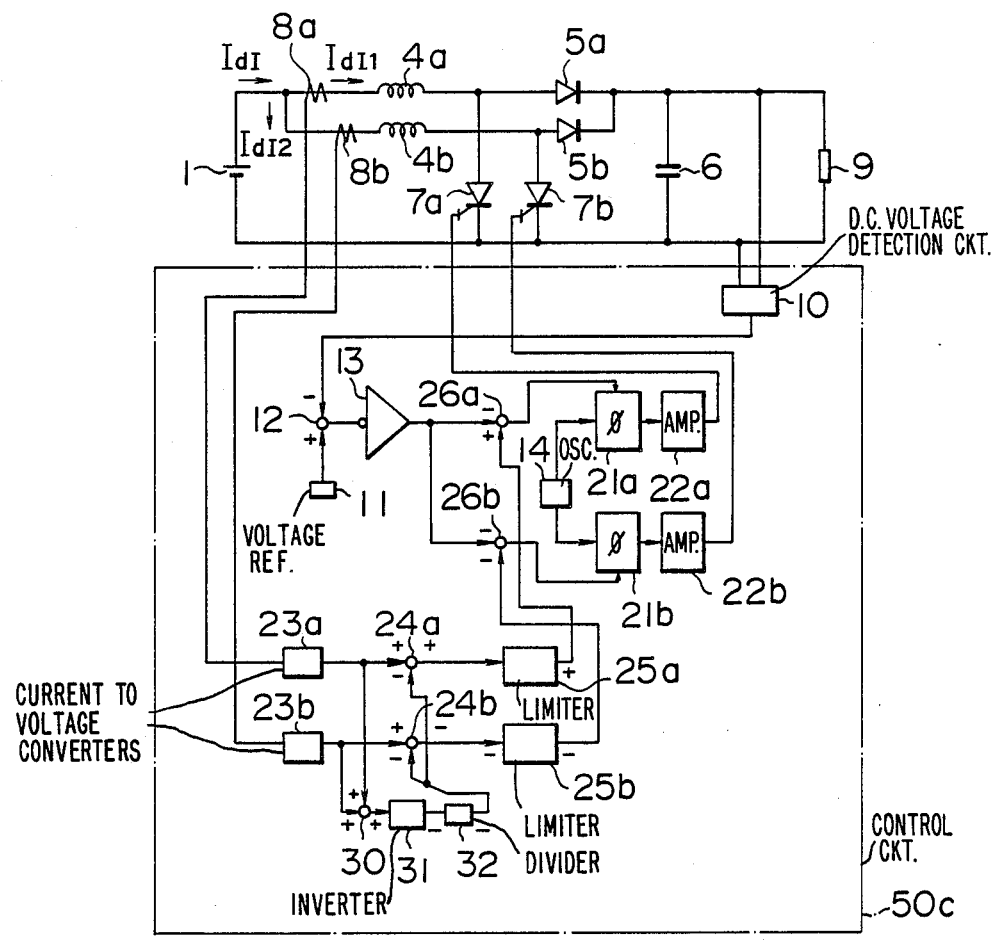
FIG. 1 is a circuit diagram showing an embodiment of the present invention.

In FIG. 1, DC current detectors 8a and 8b detect the chopper currents. Current to voltage converters 23a and 23b convert the output currents of the DC current detectors 8a and 8b into voltage. An adder 30 adds the chopper currents to obtain an input current of the chopper apparatus. An inverter circuit 31 inverts the polarity of the output from the adder 30. A voltage divider 32 divides the output of the inverter circuit 31 by half and obtains an average value of the input current $I_{dI}$ of the chopper apparatus. Adders 24a and 24b are for obtaining current deviations of the chopper input currents $I_{dI1}$ and $I_{dI2}$ from the average value of the input current $I_{dI}$. Limiters 25a and 25b limit the signal levels applied to adders 26a and 26b, i.e., the current deviation signals, within a predetermined level. The adders 26a and 26b input the current deviation signals to the output of the error amplifier 13.

Referring now to FIG. 1, the operation of the control circuit 50c will be described as to how the chopper currents $I_{dI1}$ and $I_{dI2}$ are controlled to balance specifically when the former current $I_{dI1}$ becomes larger than the latter current $I_{dI2}$. If $I_{dI1} > I_{dI2}$, then it can be considered that the ON period of GTO 7a is longer than that of GTO 7b. The reason for this will be described in the following. As described previously and as apparent from the equation (1), the longer ON period (or the shorter OFF period because of a constant frequency) makes the chopper output voltage higher. Due to the higher output voltage, the corresponding current flows, i.e., the corresponding voltage drop in the chopper becomes large to lower the output voltage and make it equal to that of the shorter ON period. $I_{d/1} > I_{d/2}$ means that $I_{d/1}$ is large and $I_{d/2}$ is small as compared with the average chopper current, i.e., $\frac{1}{2} (I_{d/1} + I_{d/2})$. Therefore, as shown in FIG. 1, the output polarities of the adders 24a and 24b becomes respectively different positive and negative polarities. The absolute values of the adders 24a and 24b are limited by the limiters 25a and 25b so as to make them smaller than the output absolute value of the error amplifier 13. Therefore, the addition results by the adders 26a and 26b (the addition of a negative value and a positive value by the adder 26a, and the addition of a negative value and a negative value by the adder 26b) show that the absolute value outputted by the adder 26a becomes smaller than that by the adder 26b. As described previously, since the phase shifters 21a and 21b control the ON periods of GTO 7a and GTO 7b in proportion to the absolute values outputted by the adders 26a and 26b, respectively, the ON period of GTO 7a becomes narrower and that of GTO 7b becomes broader. The ON periods of GTO 7a and GTO 7b are controlled to become equal in such a way that the chopper currents $I_{d/1}$ and $I_{d/2}$ become equal to each other thereby to ensure a balanced state. In case of $I_{d/1} < I_{d/2}$, the output polarities of the adders 24a and 24b become opposite to those shown in FIG. 1. Thus, the ON period of GTO 7a is controlled to become broad, while that of GTO 7b is controlled to become narrow.

As seen from the foregoing description of the embodiment, it is not necessary to select the switching elements of the choppers so as to have the same switching times for balance of the chopper currents. Thus, selection of the switching elements is far more easy as compared with the prior art. In addition, it contributes to reduction of the apparatus cost. Furthermore, the resistance value of the DC reactor can be made small, resulting in a compact apparatus and a remarkable improvement in efficiency of the apparatus.

Next, referring to FIG. 2, a second embodiment of the present invention will be described in connection with FIG. 2, common reference numerals as utilized in FIG. 1 have the same element labels and operational functions as described in connection with FIG. 1. The operation of the control circuit 50c will be described as to how the chopper currents $I_{d/1}$ and $I_{d/2}$ are controlled to balance specifically when the former current $I_{d/1}$ becomes larger than the latter current $I_{d/2}$. Assuming that the chopper current become $I_{d/1} > I_{d/2}$, then it can be considered that the ON period of GTO 7a becomes longer than that of GTO 7b. In other words, as apparent from the above-described equation (1), if the ON period is long, i.e., if the duty ratio (a ratio of the ON period to the one-cycle period) is large, the chopper output voltage becomes correspondingly high. However, since the outputs of the two chopper circuits are connected in parallel, an amount of current flowing through the chopper with a longer ON period becomes large to accordingly have a large voltage drop. In particular, according to the embodiment of FIG. 2, the chopper currents $I_{d/1}$ and $I_{d/2}$ are detected by the corresponding DC current detectors 8a and 8b are converted into proper levels by the current to voltage converters 23a and 23b. The outputs from the circuits 23a and 23b are compared by the current deviation detection circuit 24 to derive deviations of both currents. The deviations are added to the output from the error amplifier 13 of the chopper output voltage control system and respectively inputted to the adders 26a and 26b, with their polarities differing from each other relative to the output of the error amplifier 13. In other words, the deviations are added in such a way that the deviation of a different polarity from that of the error amplifier 13 output polarity is applied to the adder 26a, while another deviation of the same polarity as that of the error amplifier 13 output polarity is applied to the adder 26b. Thus, the phase shifter 21a operates to make the ON period of GTO 7a short, while the phase shifter 21b operates to make the ON period of GTO 7b long, so that the chopper current $I_{d/1}$ is reduced and the chopper current $I_{d/2}$ is increased to ensure the balance between the two chopper circuits. In case of $I_{d/1} < I_{d/2}$, the outputs of the current deviation detection circuit 24 becomes opposite to the above to control the ON period of GTO 7a broad and that of GTO 7b narrow.

Figure 2:
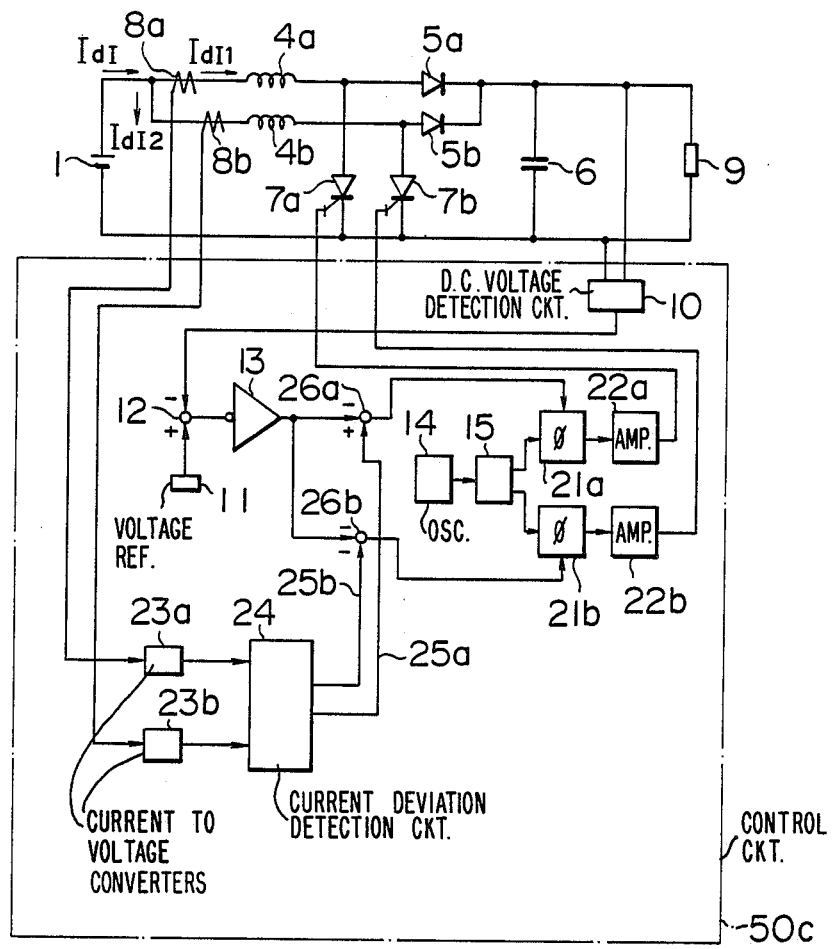
FIG. 2 is a circuit diagram showing another embodiment of the present invention.
Figure 4:
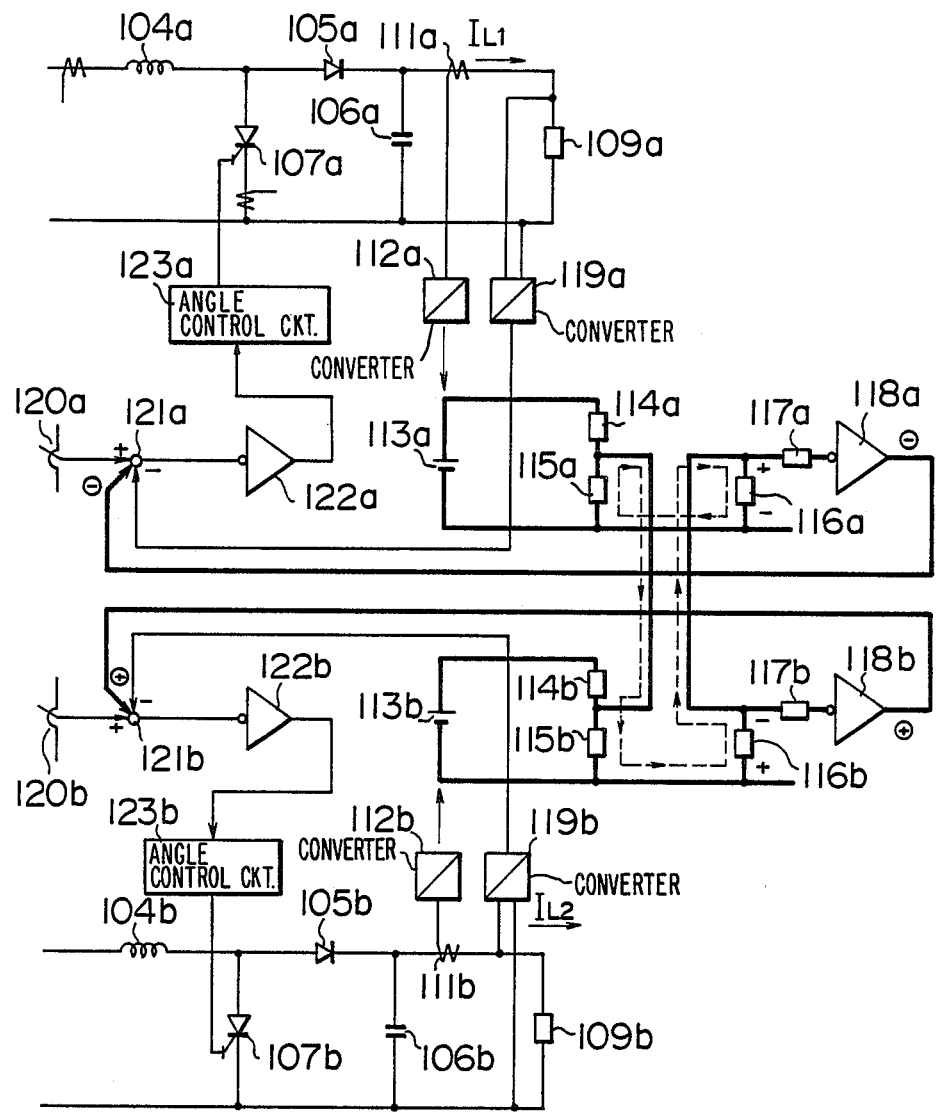
FIG. 4 is a schematic diagram showing a control circuit for balancing currents flowing through the choppers of a two phase type.

FIG. 4 shows a current balance control circuit for balancing the two choppers of the embodiment of FIG. 2.

In this circuit, the control object is two choppers constructed of the elements 104 to 107 and 109 corresponding to the elements 4 to 7 and 9 of the two choppers shown in FIG. 2, wherein reference numerals 104 to 107 and 109 have been designated by adding 100 to the corresponding reference numerals 4 to 7 and 9, and a suffix a or b shows respective one side of the two choppers. The state of balance of currents between both choppers is detected by comparing the chopper currents, i.e., the load currents in case of FIG. 4, and the conduction angles of the GTOs for the chopper apparatus are controlled.

The load current of each chopper is detected by a current transformer 111 and converted into voltage by a converter 112. The output of the converter 112 is represented by a battery 113. A resistive voltage divider circuit made of resistors 114 and 115 are connected across both terminals of the battery 113. One end of the voltage divider circuit is connected to an input terminal of an operational amplifier 118 via resistors 116 and 117. The center connections of the respective resistive voltage divider circuits of the chopper apparatus are connected together, and the respective interconnections of the resistors 116 and 117 are also connected together. Thus, a closed loop designated by a broken line, whose arrows indicate the direction of current, is constructed of the resistors 115a, 115b, 116b and 116a. The direction of current shown in FIG. 4 is obtained when the voltage of the battery 113a is larger than that of the battery 113b. This occurs when the load current $I_{L1}$ of the upper chopper shown in FIG. 4 is larger than the load current $I_{L2}$ of the lower chopper.

In this case, it is necessary to control the load current $I_{L1}$ and the load current $I_{L2}$ large. Such control is conducted by utilizing the voltages appearing across the resistors 116a and 116b. In particular, the upper terminal in FIG. 4 of the resister 116a has a positive voltage which is polarity-inverted into a negative signal by the operational amplifier 118a and supplied to an adder 121a. The adder 121a is supplied with a reference voltage from a voltage reference 120a and with a negative signal of a load voltage signal from a converter 119. Therefore, the output of the adder 121a is a signal obtained from the comparison result of the reference voltage and the load voltage signal which has been corrected in accordance with the degree of imbalance of the load currents.

The output of the adder 121a is supplied through an operational amplifier 122a to a conduction angle control circuit 123a. The conduction angle control circuit 123a constructed of a phase shifter and a pulse amplifier controls the conduction angle of GTO 107a as previously described. Thus, the load current $I_{L1}$ of the upper chopper is reduced, and correspondingly the load current $I_{L2}$ of the lower chopper is increased, thereby balancing the chopper currents.

Contrary to the above operation, if the load current $I_{L1}$ of the upper chopper becomes smaller than the load current $I_{L2}$ of the lower chopper, the polarities of the signals described above are inverted and the corresponding operation is effected to balance the chopper currents.

Figure 5:
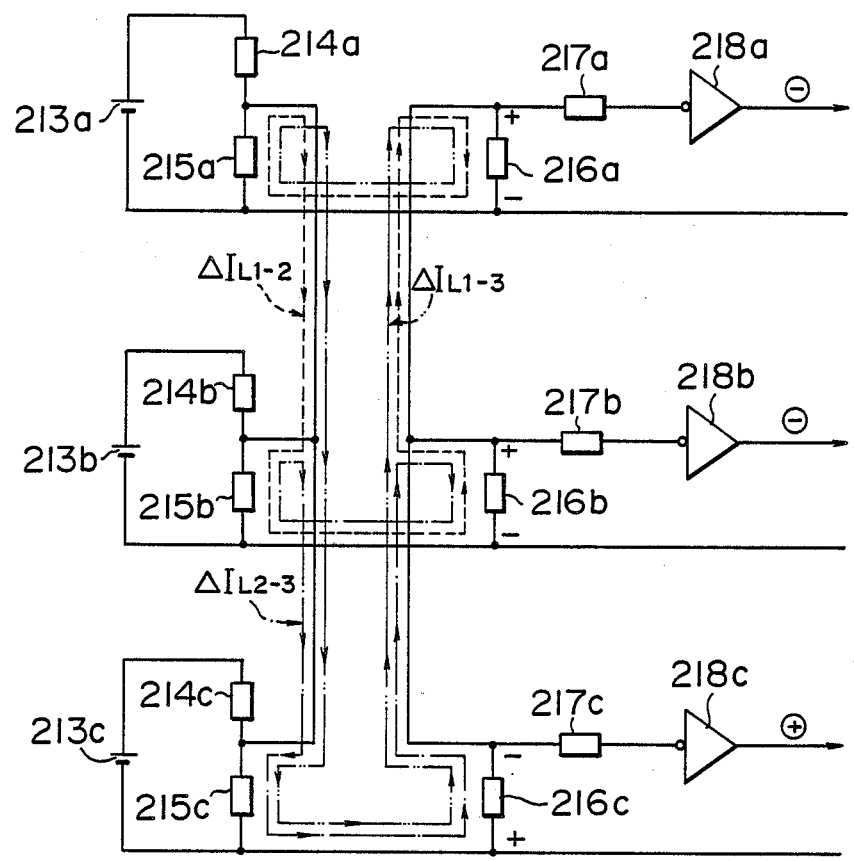
FIG. 5 is a schematic diagram showing a control circuit for balancing currents flowing through the choppers of a three phase type.

FIG. 5 shows part of a current imbalance detection circuit for controlling the current balance between three choppers of the chopper apparatus. The circuit is constructed of the elements designated by reference numerals in the 200's corresponding to the elements designated by the 100's in FIG. 4. The elements having the same lower two digits in FIGS. 5 and 4 correspond to each other. In this circuit, the center connections of the respective voltage divider circuits are connected together, and the respective interconnections of the resistors 116 and 117 are also connected together.

In this circuit, if an imbalance of the chopper currents occurs, current loops as shown in FIG. 5 by a broken line, one-dot chain line and two-dot chain line are formed. In particular, these loops stand for three pairs of choppers assorted from the three choppers. In the respective loops, signals corresponding in magnitude of the chopper load currents appear across the corresponding resistors 216a, 216b and 216c. The voltages corresponding to the total currents flowing through the three loops practically appear across the resistors 216a, 216b and 216c. These voltages are applied through resistors 217a, 217b and 217c to the operational amplifiers 218a, 218b and 218c. As a result, the operation similar to that shown in FIG. 4 is effected.

As described above, according to the present invention, it is not necessary to select the switching elements with the same switching time so as to balance the chopper currents. Therefore, the requirements in selecting the switching elements are moderated. Furthermore, it is not necessary to make the resistance value of the DC reactor large so as to balance the chopper currents. Therefore, a compact and low cost apparatus with an improved efficiency is possible.

Figure 3:
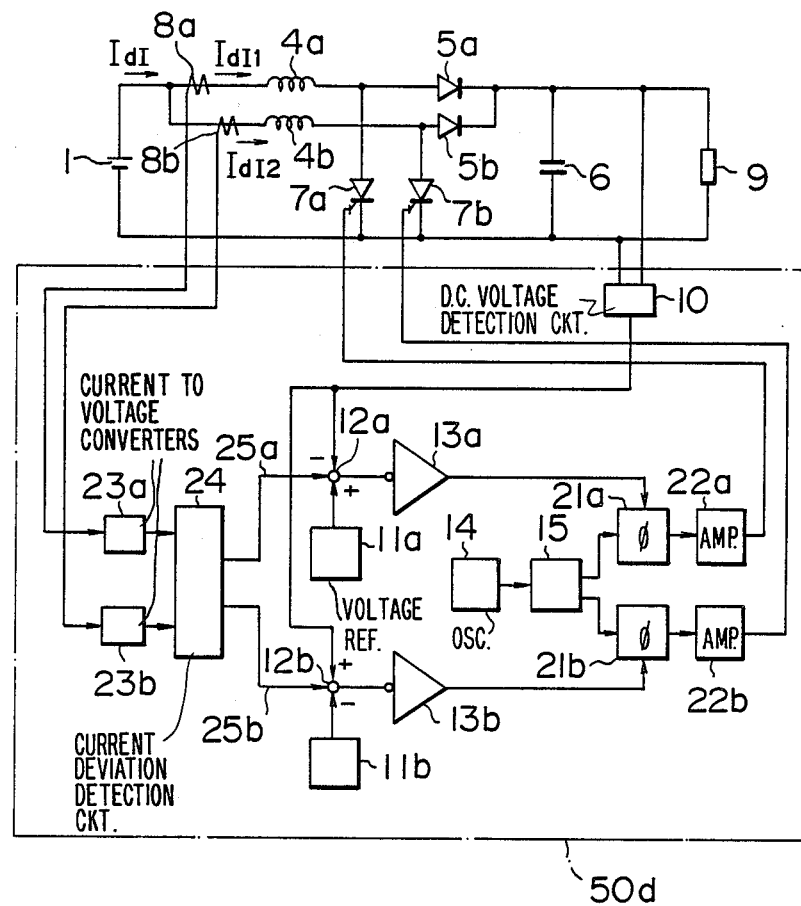
FIG. 3 is a circuit diagram showing a further embodiment of the present invention.

In the above embodiments, two chopper circuits have been used and the error detection amplifier 13 for voltage control has been used in common for the two chopper circuits. However, as shown in FIG. 3, the present invention is also applicable to the chopper apparatus having separate error amplifiers 13a and 13b. Also in FIG. 3, the current deviation signals 25a and 25b may be supplied to comparators 12a and 12b whose outputs are inputted to the error amplifiers 13a and 13b. Instead of the chopper apparatus having two choppers, a chopper apparatus having more than three choppers may be applied. Parallel drive of the chopper apparatus have more than two choppers is also applicable. In the above embodiments, GTOS have been used as the switching elements of the chopper circuits. However, any switching elements such as transistors, thyristors ay also be used. It is obvious that a step-down chopper may be used instead of a step-up chopper.

It is obvious that various modifications of the invention may be possible without being limited merely to the above embodiments. For instance, more than three chopper circuits may be used instead of the two chopper circuits of the embodiments. In the embodiments, although a chopper circuit using GTOs has been described, a chopper circuit using another semiconductor switching element may be used. Furthermore, in the above embodiments, to obtain the average value of the chopper currents, the sum of the chopper currents is first obtained and thereafter the sum is divided by half. However, another method may be used wherein the input current to the chopper apparatus is directly detected and thereafter the detected input current is divided by half to obtain the average value.

According to the present invention described above, it is not necessary to make the impedance value of the DC reactor higher than required and to limit the switching characteristic of the element to be used. Therefore, the current balance of a plurality of choppers can be conducted with a simple circuit arrangement and the requirements for the circuit elements are remarkably moderated. Thus, it is possible to realize a compact and low cost apparatus with an improved efficiency.

What is claimed is:

1. A control device for an apparatus having a plurality of choppers connected in parallel between a DC power source and a load, said apparatus supplying a voltage to said load, each of said choppers including a semiconductor switch, said control device comprising:

a plurality of DC current detection circuits, each connected to one of said plurality of choppers for detecting a chopper current of one of said plurality of choppers, respectively;

a first circuit connected to said plurality of DC current detection circuits for generating an average value of said plurality of chopper currents;

a plurality of second circuits, each connected to one of said DC current detection circuits and to said first circuit for comparing one of said chopper current detected by one of said DC current detection circuits with said average value to derive deviation values, respectively;

a third circuit for detecting an output voltage of said apparatus;

a fourth circuit connected to said third circuit for comparing said output voltage of said apparatus with a predetermined voltage reference and for generating a voltage control signal based on a comparison result so that said output voltage is controlled to be equal to said predetermined voltage reference;

a plurality of fifth circuits, each connected to said fourth circuit and one of said second circuits for adding a value of said voltage control signal and one of said deviation values to produce a modified voltage control signal, respectively, so that the values of said plurality of chopper currents are substantially equal to each other;

an oscillator circuit for generating a pulse signal;

a plurality of phase shifters, each connected to said oscillator circuit and one of said plurality of fifth circuits for shifting a phase of said pulse signal based on said modified voltage control signal, respectively;

a plurality of pulse amplifier circuits, each connected to one of said plurality of phase shifters and one of said choppers, for isolating and supplying an output signal of one of said plurality of phase shifters to one of said semiconductor switches of one of said choppers, respectively, each of said semiconductor switches being controlled to be switched ON and OFF based on one of said output signals of said plurality of pulse amplifier circuits, respectively; and a plurality of limiter circuits, each connected to one of said second circuits for limiting said deviation value and for supplying said limited deviation value to one of said fifth circuits as said deviation value, respectively.

2. A control device as set forth in claim 1, wherein said semiconductor switch includes a gate turn-off thyristor.

3. A control device as set forth in claim 1, wherein said first circuit includes:

an adder connected to said plurality of DC current detection circuits for adding said plurality of chopper currents;

a circuit connected to said adder for polarity-inverting an output of said adder; and a voltage divider connected to said polarity-inverting circuit for driving an output of said polarity-inverting circuit by the number of said choppers to produce said average value.

* * * * *